(12) United States Patent
Behl

(10) Patent No.: US 6,374,893 B1
(45) Date of Patent: Apr. 23, 2002

(54) PLASTIC WELDER

(76) Inventor: Leonard Iven Behl, 436 Greystone Ave., Kansas City, KS (US) 66103

( * ) Notice: Subject to any disclaimer, the term of this patent is extended or adjusted under 35 U.S.C. 154(b) by 78 days.

(21) Appl. No.: 09/617,572

(22) Filed: Jul. 17, 2000

Related U.S. Application Data

(60) Provisional application No. 60/145,054, filed on Jul. 22, 1999, and provisional application No. 60/093,938, filed on Jul. 23, 1998.

(51) Int. Cl.$^7$ ............................................. B32B 31/26
(52) U.S. Cl. ........................ 156/497; 156/82; 156/499; 156/579
(58) Field of Search ........................... 156/82, 94, 497, 156/499, 574, 579

(56) References Cited

U.S. PATENT DOCUMENTS 4,260,439 A * 4/1981 Speer .......................... 156/98
4,642,158 A * 2/1987 Steinel et al. ............... 156/497

* cited by examiner

Primary Examiner—James Sells

(57) ABSTRACT

A plastic welder that is attachable to a source of heated air for the purpose of welding crystaline thermoplastic materials comprising a tip, a hook, a nose, an eyelet vent, a body, a parabolic vent, a deflector, a flue entrance, and a base. Heated air is blown through the plastic welder with some of the heated air escaping through the parabolic vent which preheats the material to be welded with the balance of the heated air being deflected into the flue entrance. The balance of the heated air flows through the body of the plastic welder, escaping through the eyelet vent, both melting the material to be welded and also heating the hook, nose, and tip of the plastic welder.

2 Claims, 4 Drawing Sheets

PLASTIC WELDER

CROSS REFERENCES TO RELATED APPLICATIONS

U.S. Provisional Applications for Patent Ser. No. 60/093,938 fo Jul. 23, 1998 and 60/145,054 of Jul. 22, 1999 with the same title, "Plastic Welder" which are hereby incorporated by reference. Applicant claims priority for the U.S. Provisional Application for Patent Ser. No. 60/145,054 of Jul. 22, 1999 pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not applicable.

BACKGROUND OF THE INVENTION

1. Field of the Invention

The present invention is a device for repairing cracks and ruptures in crystalline thermoplastic materials.

2. Background Information

There really isn't a convenient way to repair cracks in crystalline thermoplastic parts such as automobile bumpers and fenders and childrens toys, to name a few.

Often when cracks and tears develop in thermoplastic materials, the thermoplastic material degenerates and then the material cracks and tears.

Current technology involves using a rod of similar plastic material which is melted so it flows between the surfaces to be welded. Current technology is not renovating the crystalline thermoplastic material as the rod of similar plastic material is melted between the cracks. Consequently, a joint resulting with this technology is not as strong as the original material was. There is usually a problem matching any colors involved.

As will be seen from the subsequent description of the present invention, the present invention is a solution to the current lack of a convenient way to repair cracks in such crystalline thermoplastic parts.

SUMMARY OF THE INVENTION

The present invention is a device for welding crystalline thermoplastic materials that attaches to a commercially available hand held electric heating tool that directs hot air from the heating tool to the crystalline thermoplastic material to be welded.

The present invention is also a method for welding crystalline thermoplastic materials as well as repairing cracks in such materials. The hot air flow from the heating tool is directed through a body to a tip that is heated by the hot air flow sufficiently to melt the crystalline thermoplastic material. Some of the hot air escapes from a parabolic vent and serves to preheat said thermoplastic material. Hot air from an eyelet vent serves to melt said thermoplastic material in the vicinity of the tip as well as to heat the tip, a hook, and a nose. The tip, after it is heated sufficiently, serves as a heat sink, so the nose, the hook, and the tip can be used to manipulate the melted thermoplastic material to be welded so as to form a weldment repairing said thermoplastic material. The tip facilitates crack repairs in said thermoplastic material.

The preferred embodiment of the present invention comprises the tip, the hook, the nose, a parabolic vent, an eyelet vent, the body, a deflector, a flue entrance, and a base.

The preferred embodiment of the present invention can be silver soldered onto a prior art nozzle that is common to a prior art heat gun.

The preferred embodiment of the present invention can be fabricated from five eighths inch diameter copper or copper alloy tubing. An alternate embodiment of the present invention features a seam and a clamp that permits attachment of said alternate embodiment to said prior art nozzle. This facillitates changing said alternate embodiments.

The temperature of said hook can be varied by varying the length of said body. Said hook serves as a heat sink. The mass of the hook can be increased by adding to the heat sink, by adding silver solder to build up said hook.

In the preferred embodiment of the present invention, the tip is filled, preferably with silver solder to prevent buildup of burnt plastic residue.

DESCRIPTION OF THE PREFERRED EMBODIMENTS

Figure 1:
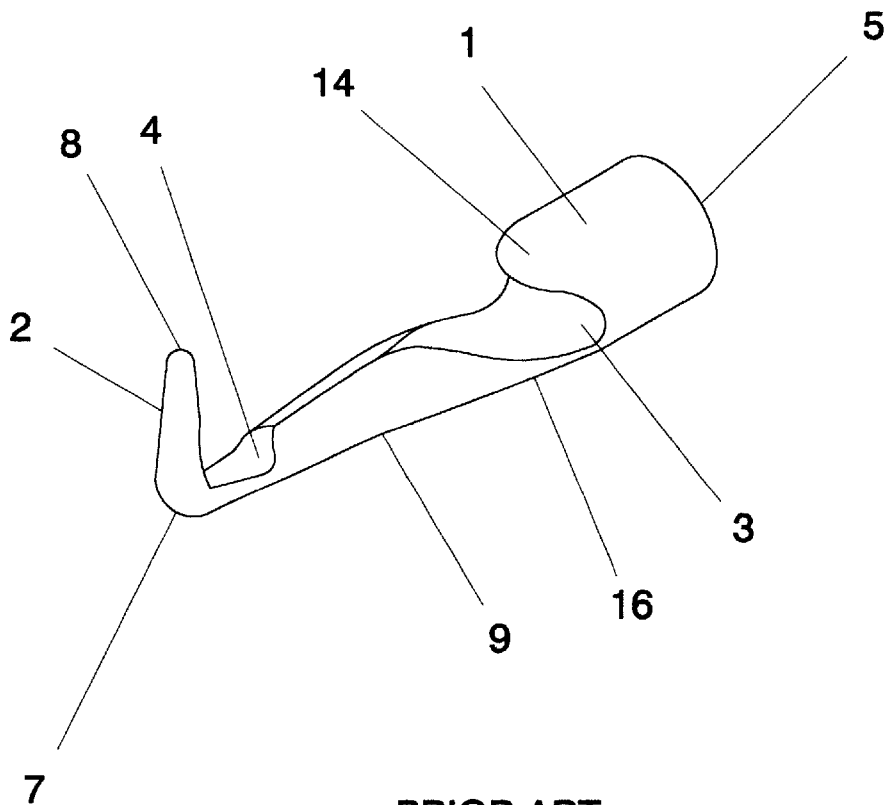
FIG. 1 is a view of the preferred embodiment of the present invention.

Referring to FIGS. 1, 2, 4, and 5 the preferred embodiment of the present invention, a plastic welder 1 comprises a hook 2, a parabolic vent 3, an eyelet vent 4, a base 5, a nose 7, a tip 8, a body 9, a deflector 14, and a flue entrance 16.

Figure 2:
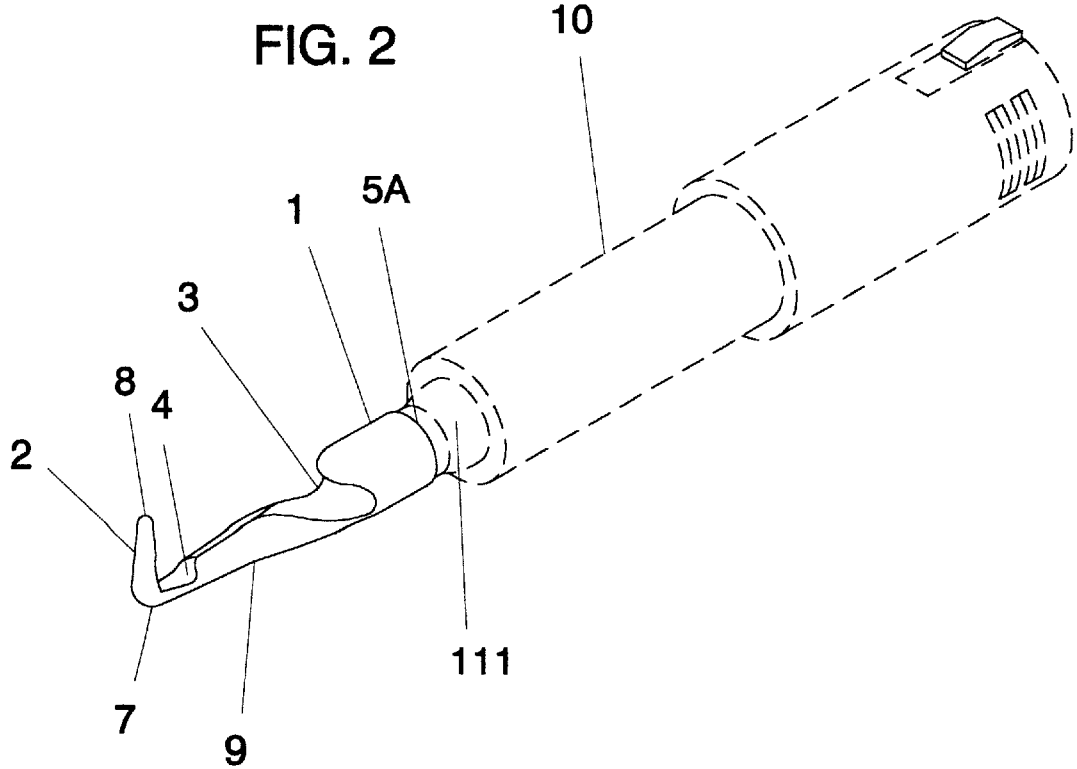
FIG. 2 is a view of the present invention installed on a prior art heat gun.

FIG. 2 shows the plastic welder 1 attached to a prior art heat nozzle 111 of a prior art heat source 10. In the preferred embodiment of the present invention, the prior art heat source 10, which serves as a source of heated air, with the prior art heat nozzle 111 is a MILWAUKEE Precision Hot Tool Model 1400 which is a product of MHT Products Inc., 2755 S. 160th. Street, New Berlin, Wis. 53151-3601, Phone 1-800-558-8880.

The present invention can be be formed from a piece of rigid copper tubing, such as a piece of ⅝ inch diameter rigid copper tubing. Copper or an appropriate copper alloy is desirable because of its ability to conduct heat and withstand corrosion. Melted thermoplastics tend to be corrosive.

The length of the body 9 affects the temperature resulting on the hook 2 from hot air from the prior art heat source 10. The desired temeperature depends on what type of crystalline thermoplastic material is to be welded. A longer body 9 results in a cooler tip than a shorter body 9. The use of a "hot" hook 2 vs. a cooler hook 2 depends on gauge and type of said thermoplastic material to be welded.

Figure 4:
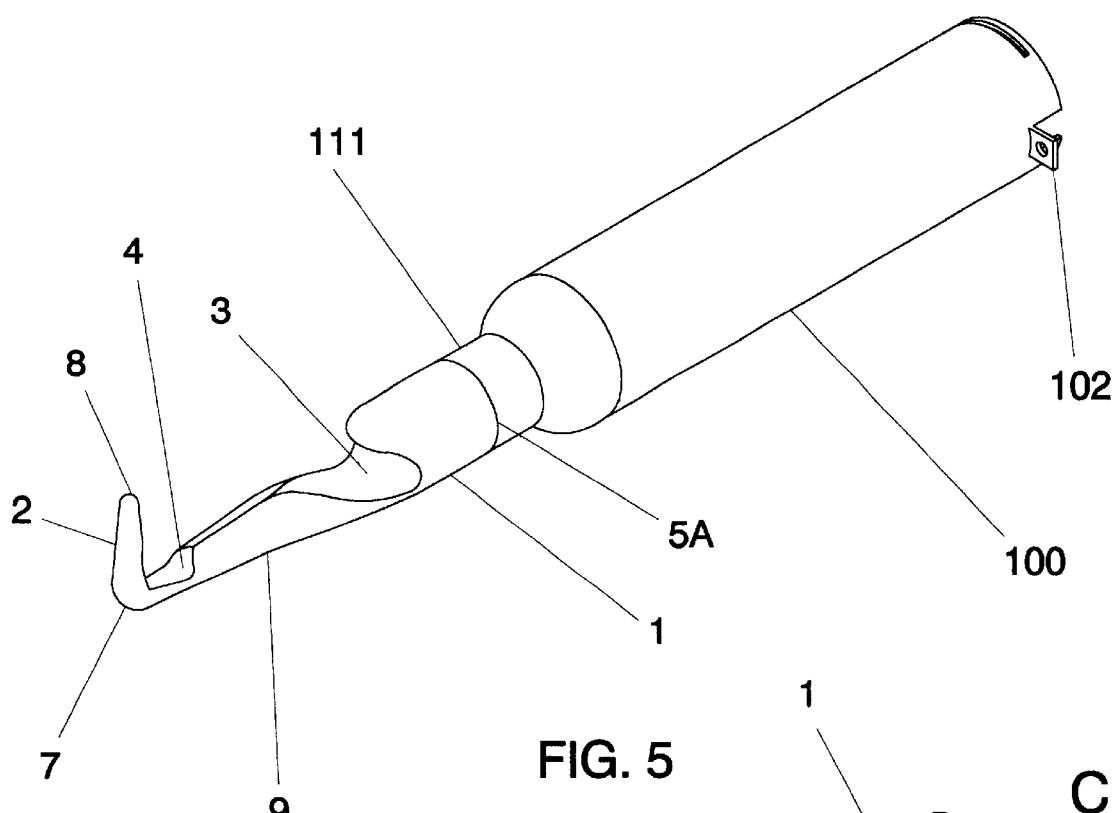
FIG. 4 is a view of an alternate embodiment of the present invention.

FIG. 4 shows a heat nozzle assembly 100 which comprises the prior art heat nozzle 111 with a junction 102 for attachment to the prior art heat source 10 and the plastic welder 1. The plastic welder 1 is attached to said nozzle 111 by silver solder in the preferred embodiment of the present invention. However, as obvious to anyone skilled in the art, the heat nozzle assembly 100 could be fabricated as a sincle unit for direct attachment to the prior art heat source 10.

Figure 3:
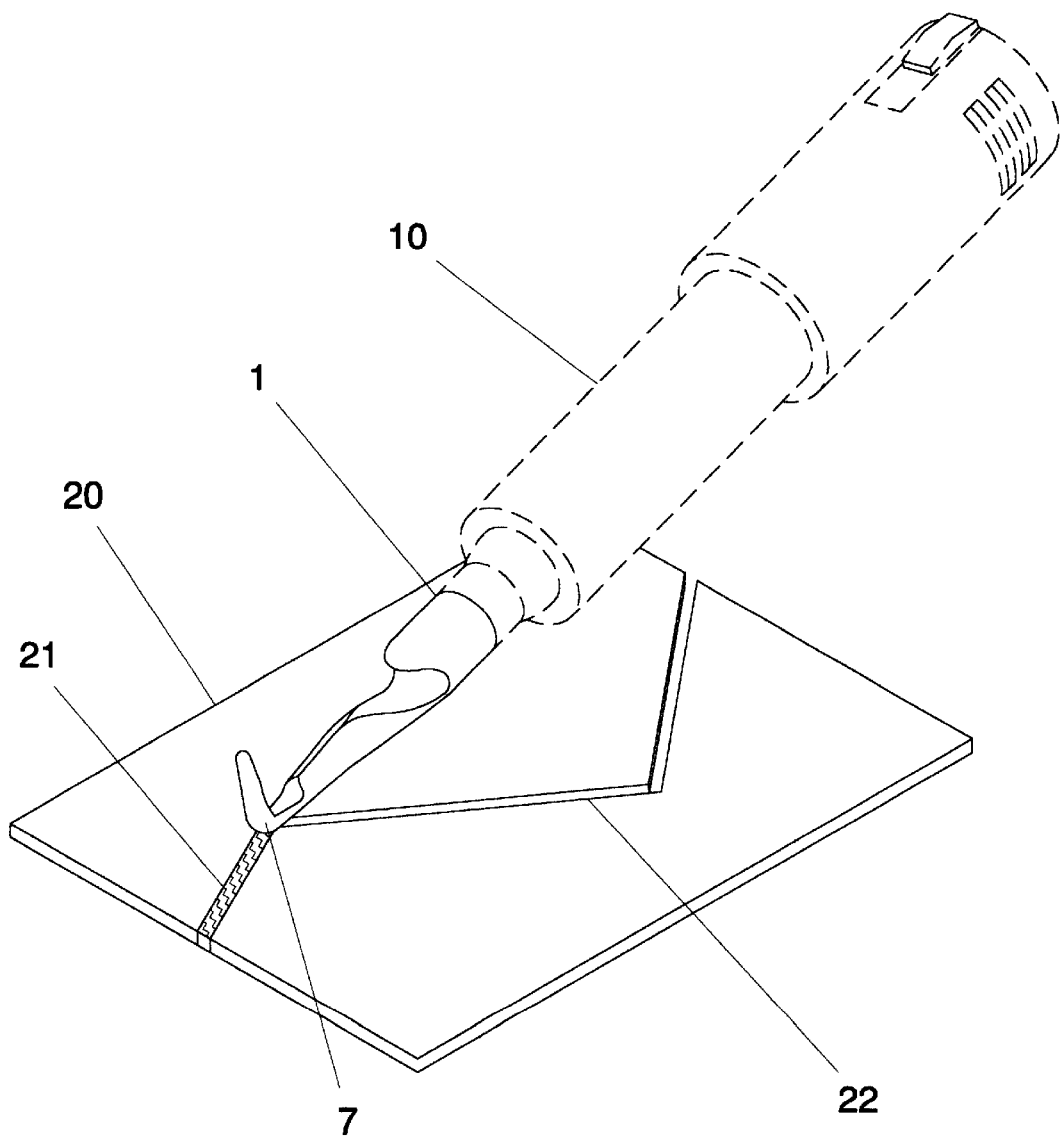
FIG. 3 is a view of an application of the preferred embodiment of the present invention.
Figure 5:
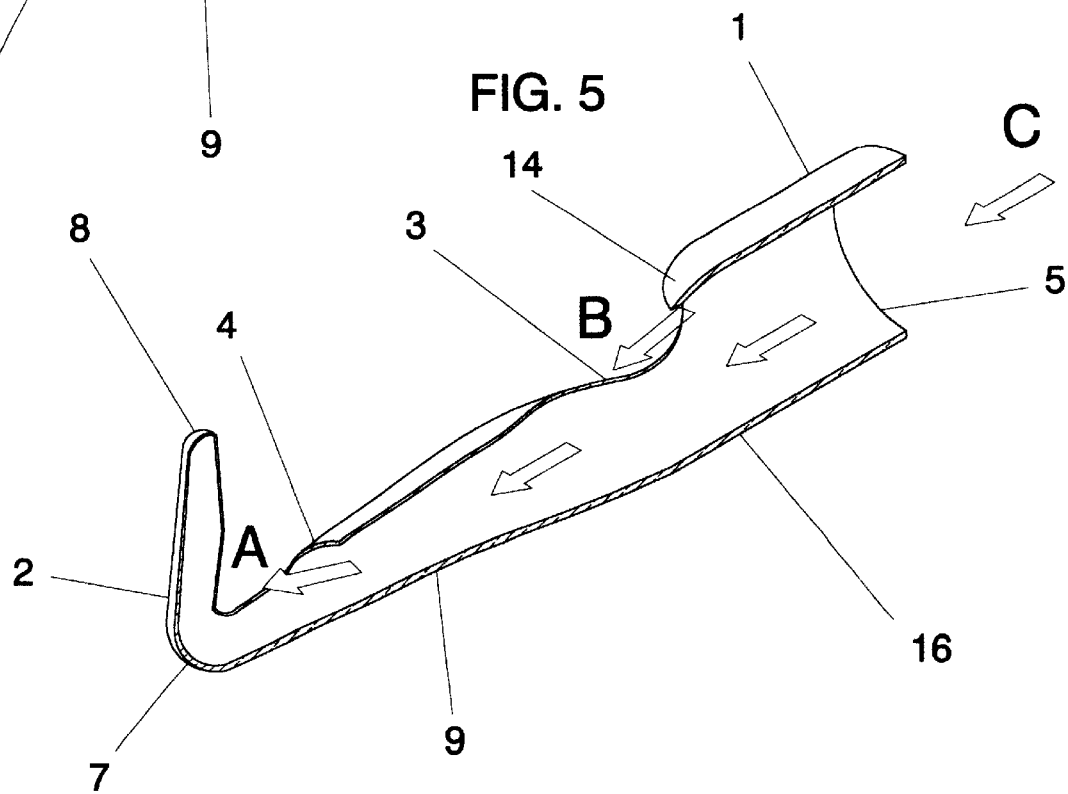
FIG. 5 is an illustration of air flow through the preferred embodiment of the present invention.

FIG. 5 illustrates heated air flow through the plastic welder 1. Hot air escaping through the parabolic vent 3 will preheat the crystalline thermoplastic material 20 (Ref. FIG. 3) while hot air escaping from the eyelet vent 4 heats said thermoplastic material 20 being massaged and manipulated by the nose 7 of the hook 2 as well as the nose 7, the hook 2 and the tip 8. The deflector 14 deflects hot air into the flue entrance 16 of the body 9, said body 9 acting as a flue.

The directed air flow from the parabolic vent 3 to the said thermoplastic material 20 renovates said thermoplastic material by melting degenerated portions of said thermoplastic material 20 which was the result of the fatigue and stresses imposed that caused said material 20 to crack and tear in the first place. The hot air from the eyelet vent 4 liquifies said thermoplastic material 20 so as to make it malleable for shaping and moving by the nose 7, the hook 2 or the tip 8, as required. Some temperature control can be exercised by an operator by turning the heat source 10 on and off intermittently.

By adjusting the size of the parabolic vent 3 as well as the eyelet vent 4, along with the shape of the deflector 14, the hook 7 temperature can be varied, as well as the amount of heat directed to preheating said thermoplastic material 20 and to liquifying of said thermoplastic material 20.

FIG. 3 shows an application of the plastic welder assembly 1 repairing a crack 22 in a sheet of crystalline thermoplastic material 20. The heat source 10 was turned on, with the plastic welder assembly 1 installed. After the the nose 7 is warm enough, the nose 7 can be rubbed along the crack 22 manipulating the melted crystalline thermoplastic material 20 along both sides of the crack 22. The nose 7, as well as the hook 2 and the tip 8 (Ref. FIG. 1) are used as needed for achieving a repair 21.

If more material is needed, as a filler, often this is obtainable by shaving material off said material from where it would not be normally noticeable, such as an edge. The filler material, being of the same type of material and also the same color, results in an attractive repair 21.

Figure 6:
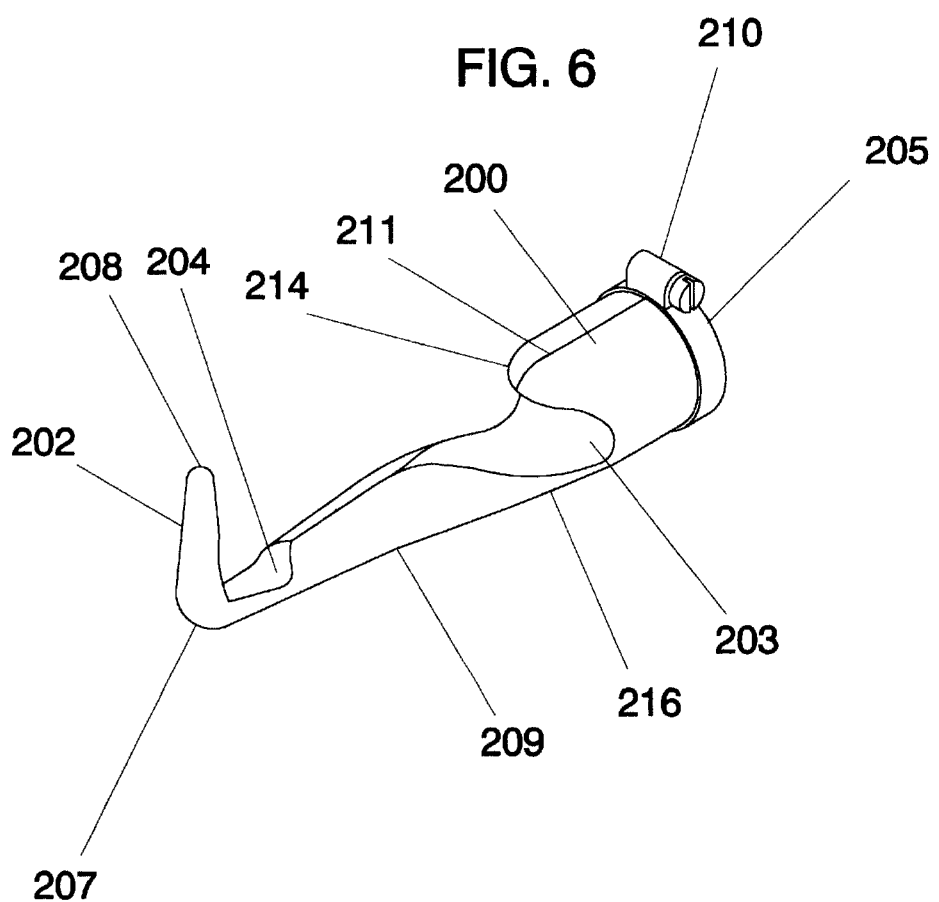
FIGS. 6 and 7 illustrate an alternate embodiment of the present invention.
Figure 7:
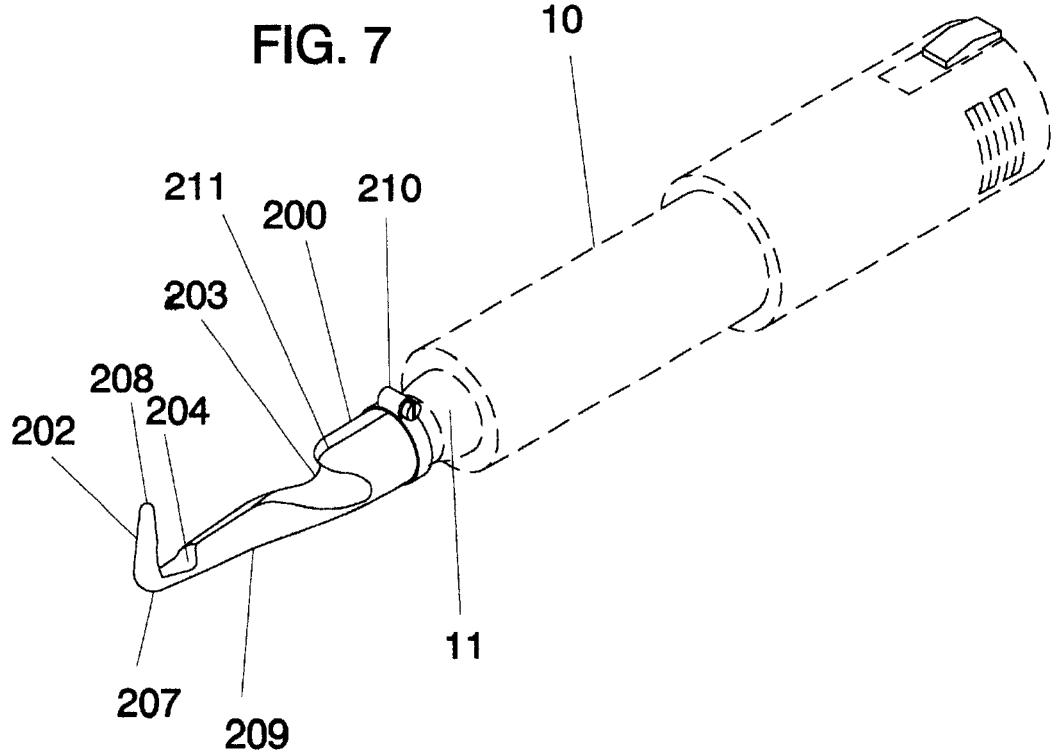

FIGS. 6 and 7 illustrate an alternate embodiment of the present invention, a clamp-on plastic welder 200 which comprises an alternate tip 208, an alternate hook 202, an alternate nose 207, an alternate eyelet vent 204, and alternate base 205, an alternate body 209, an alternate parabolic vent 203, a split section 211, an alternate deflector 214, an alternate flue entrance 216, and a band clamp 210. The band clamp 210 would normally be attached to the alternate base 205, preferably by silver solder.

An advantage of the clamp-on plastic welder 200 is that a person could exchange different said clamp-on plastic welder 200 depending on what crystalline thermoplastic material 20 was being repaired. Said different clamp-on plastic welders 200 could have different alternate body lengths 209 or various sized vents 203 and 204, depending on temperatures required on said thermoplastic material 20 or said alternate nose 207, alternate hook 202, and alternate tip 208.

FIG. 7 shows the the clamp-on plastic welder 200 clamped on the prior art heat source 10. The split section 211 facilitates both clamping of said welder 200 on the prior art heat source 10 and also fabrication of said welder 200 from copper strip metal in coiled forms, fed into high speed metal forming machinery such as machinery known in the trade as multislide forming machinery.

An advantage of the present invention is that it can be hand held while operating.

Although the description above contains many specificities, these should not be construed as limiting the scope of the invention but as merely providing illustrations of some of the presently preferred embodiments of this invention.

For example, other metals can be used instead of copper.

Also, other means of joining and attaching could be used instead of silver solder.

It will be obvious to those skilled in the art that modifications may be made to the embodiments described above without departing from the scope of the present invention. Thus the scope of the invention should be determined by the appended claims and their legal equivalents, rather than by the examples given.

I claim:

1. A plastic welder that is attachable to a source of heated air for the purpose of welding crystalline thermoplastic materials, said plastic welder comprising:

a) a tip,
 b) a hook,
 c) a nose,
 d) an eyelet vent,
 e) a body,
 f) a parabolic vent,
 g) a deflector,
 h) a flue entrance, and
 i) a base,
  wherein heated air is blown through the plastic welder from the source of heated air, with some of the heated air escaping through the parabolic vent which preheats the crystalline thermoplastic material to be welded, and the balance of the heated air being deflected into the flue entrance,
  wherein said balance of the heated air flows through the body of the plastic welder escaping through the eyelet vent, both melting said crystalline thermoplastic material to be welded and also heating the hook, nose and tip of the plastic welder.

2. The plastic welder for claim 1 further comprising:

a) a split section and
 b) a band clamp, said split section facilitating clamping of said plastic welder to said source of heated air.

* * * * *